United States Patent [19]

Lovely

[11] Patent Number: 5,144,689
[45] Date of Patent: Sep. 1, 1992

[54] MULTIMODE FIBER SENSOR SYSTEM WITH SENSOR FIBER COUPLED TO A DETECTION FIBER BY SPACER MEANS

[75] Inventor: Peter S. Lovely, Portland, Oreg.

[73] Assignee: Fiber Sensys, Inc., Beaverton, Oreg.

[21] Appl. No.: 738,166

[22] Filed: Jul. 30, 1991

[51] Int. Cl.⁵ .............................................. G02B 6/26
[52] U.S. Cl. .................................. 385/12; 250/227.19; 385/15; 385/39
[58] Field of Search ............... 350/96.15, 96.16, 96.20, 350/96.21, 96.22, 96.24, 96.25, 96.29, 96.30; 250/227.14, 227.19; 356/345; 385/15, 27, 31, 38, 39, 12

[56] References Cited

U.S. PATENT DOCUMENTS

| | | | |
|---|---|---|---|
| 4,297,684 | 10/1981 | Butter | 340/557 |
| 4,360,372 | 11/1982 | Maciejko | 350/96.24 X |
| 4,843,233 | 6/1989 | Jeunhomme | 250/227.19 |
| 4,854,706 | 8/1989 | Claus et al. | 356/345 |
| 4,863,270 | 9/1989 | Spillman, Jr. | 356/345 |
| 4,904,050 | 2/1990 | Dunn et al. | 350/96.29 |

OTHER PUBLICATIONS

Bucaro, Dardy & Carome, "Optical Fiber Acoustic Sensor", Applied Optics, vol. 16, No. 7, Jul. 1977, pp. 1761-1762.

Kingsley et al., "Multimode Optical-Fibre Phase Modulators & Discriminators", Electronics Ltrs., vol. 14, No. 11, May 25, 1978, pp. 322-324 & 335-337.

Kul'chin et al., "Investigation of the Influence of an Aperture Stop on the Signal/Noise Ratio in a Single-Fiber Interference-Type Sensor", Sov. J. Quantum Electron., vol. 16, No. 8, Aug. 1986, pp. 1092-1095.

Martin, Le Boudec & Jeunhomme, "Integrating Fiber Optic Vibration Sensor", SPIE vol. 985 Fiber Optic & Laser Sensors VI (1988), pp. 344-348.

Leung et al., "Fiber Optic Line—Sensing System for Perimeter Protection Against Intrusion", Tech. Digest, OFS 86, Tokyo, Japan, pp. 113-116, 1986.

*Primary Examiner*—John D. Lee
*Attorney, Agent, or Firm*—K. McNeill Taylor, Jr.

[57] ABSTRACT

A fiber-optic sensor device utilizing modal interference in a multimode optical sensor fiber, having output light from the sensor fiber coupled to an axially separated detection lead fiber, and having light from the detection lead fiber coupled to a substantially uniform light detector.

10 Claims, 1 Drawing Sheet

MULTIMODE FIBER SENSOR SYSTEM WITH SENSOR FIBER COUPLED TO A DETECTION FIBER BY SPACER MEANS

FIELD OF THE INVENTION

The present invention relates to fiber optic sensing systems utilizing modal interference in multimode optical fiber.

BACKGROUND OF THE INVENTION

When light is passed through an optical fiber that guides a plurality of modes, the different modes will generally have different optical phase shifts associated with them that depend on the length of the fiber and the differences in phase velocities of the different modes. This will cause interference effects when light from the different modes is mixed. If light intensity is measured at a point on the end of the fiber or in any region removed from the end where the modes are mixed (and less than the entire output region), the observed intensity will depend on the relative phases of the modes, and will generally change if the phases change. A very small disturbance of the fiber can cause significant inter-modal phase shifts, so this principle can be used to construct a sensor for motion, vibration, pressure changes, or any other effect that can be coupled to a fiber to induce phase changes. This type of sensor is called a modal-domain sensor. Such modal domain sensors are known in the art. See e.g. Bucaro, Dardy and Carome, "Optical Fiber Acoustic Sensor", Applied Optics, Vol. 16, No. 7, July 1977, pp. 1761–62; Butter U.S. Pat. No. 4,287,684; Kingsley et al., "Multimode Optical Fibre Phase Modulators and Discriminators", Electronics Letters, Vol. 14, No. 11, May 25, 1978, pp. 322–324 and 335–337; and, Kul'chin et al., "Investigation of the Influence of an Aperture stop on the Signal/Noise Ratio in a Single-Fiber Interference-Type Sensor", Sov. J. Quantum Electron., Vol. 16, No. 8, Aug. 1986, pp. 1092–1095.

To detect a good signal from a modal-domain sensing fiber, it is necessary to have both mixing of the modes and restriction of the light that is received by the detector. Mixing is necessary to create interference. Restriction is necessary because for small disturbances of the fiber the total amount of power that emerges is constant, even though the spatial or angular distribution of the power may change because of mixing and phase changes.

In most implementations, mixing will occur without much effort because light from more than one mode strikes each region of the detector. In any implementation, explicit means are necessary to achieve good restriction. Some restriction will always occur naturally because the detector, and the optical path between it and the fiber, are never perfectly homogeneous; but such "natural" restriction cannot be relied upon to give high sensitivity or controlled performance.

Many applications of sensors require that the sensor and the electronics for analyzing the signals from it be remote from each other. Furthermore, it is necessary that disturbances of the means for coupling signals between the sensor and the electronics should not create effects that can be confused with signals from the sensor. In the case of a fiber-optic modal-domain sensor, it is valuable to use a "source lead fiber" to couple the light source to the sensing fiber, or to use a "detection lead fiber" to couple the sensing fiber to the detector, or both. In a fiber sensor system with one or both lead fibers, the system should be highly sensitive to disturbances in the sensing fiber and insensitive to disturbances in the lead fiber or fibers.

Several prior art references have discussed means for avoiding signal distortion due to disturbances which do not impact the sensor fiber. Jeunhomme U.S. Pat. No. 4,843,233 describes an insensitive source lead system with a singlemode fiber 2 disposed between the coherent light source 1 and the multimode sensor fiber 3. In addition, one or more optical fibers $5n$ with core diameters smaller than that of the multimode sensor fiber 3 are placed between the multimode sensor fiber and the detectors $6_n$ in order to provide restriction. This restriction means can have an economic and/or performance disadvantage, due to the combination of fibers with different core diameters. Also, optimizing the fiber parameters for system performance may require a special fiber that is not mass produced for other applications and is therefore expensive.

Martin, Le Boudec and Jeunhomme, "Integrating Fiber Optic Vibration Sensor", SPIE Vol. 985 Fiber Optic and Laser Sensors VI (1988), pp. 344–348, also describe a small core returning fiber, as well as the use of laterally offset sensor and return fibers in order to convert "the spatial modulation of the speckle pattern into [the] intensity modulation of the detected light". (page 345, FIG. 2). This system has the serious disadvantage that a special component is needed to establish and maintain the offset, which may be costly because most commercially available fiber-optic components are coaxial and do not create controlled lateral offsets.

Butter U.S. Pat. No. 4,297,684 describes a method of de-sensitizing sections of a sensor fiber by shielding them within a length of copper tubing (col. 2, ll. 34–40). Leung et al., "Fiber optic line-sensing system for perimeter protection against intrusion", Tech. Digest, OFS 86, Tokyo, Japan, p. 113, describes burying insensitive sections at a deeper level than sensitive sections. This kind of protection for sections of a sensor fiber is impractical for many applications, and expensive even where practical.

SUMMARY OF THE INVENTION

I have invented a method for making a fiber-optic modal-domain sensor system, with a detection lead fiber or with both source and detection lead fibers, that is insensitive to disturbances in the detection lead fiber, and that is economical to manufacture because of simplicity and the applicability of components that are mass produced for other applications with larger markets such as telecommunications.

The present invention relates to a fiber-optic sensing system utilizing modal interference in a multimode sensor fiber, a coherent source, a detector and restriction means to truncate a portion of the multimode speckle pattern projected from the output end of the sensor fiber. A detection fiber is interposed between the restriction means and the detector and provides a disturbance insensitive light output signal to the detector. The detector measures the intensity of the light output signal and provides an output representative of the parameter being sensed by the multimode sensor fiber. The restriction means is disposed between the multimode sensor fiber and the detection fiber, to provide axial separation between the ends thereof.

In one embodiment of the present invention, the restriction means comprises a spacer disposed between first and second connector bodies which hold the axially separated ends of the sensor fiber and the detection fiber.

In yet another embodiment of the invention, the spacer means comprises a flat annular ring. In a further embodiment, the spacer means comprises a glass disk.

DETAILED DESCRIPTION OF THE INVENTION

Two embodiments of the invention are described below, by reference to FIGS. 1 and 2. The drawings are not intended to indicate scale or relative proportions of the elements shown therein.

Figure 1:
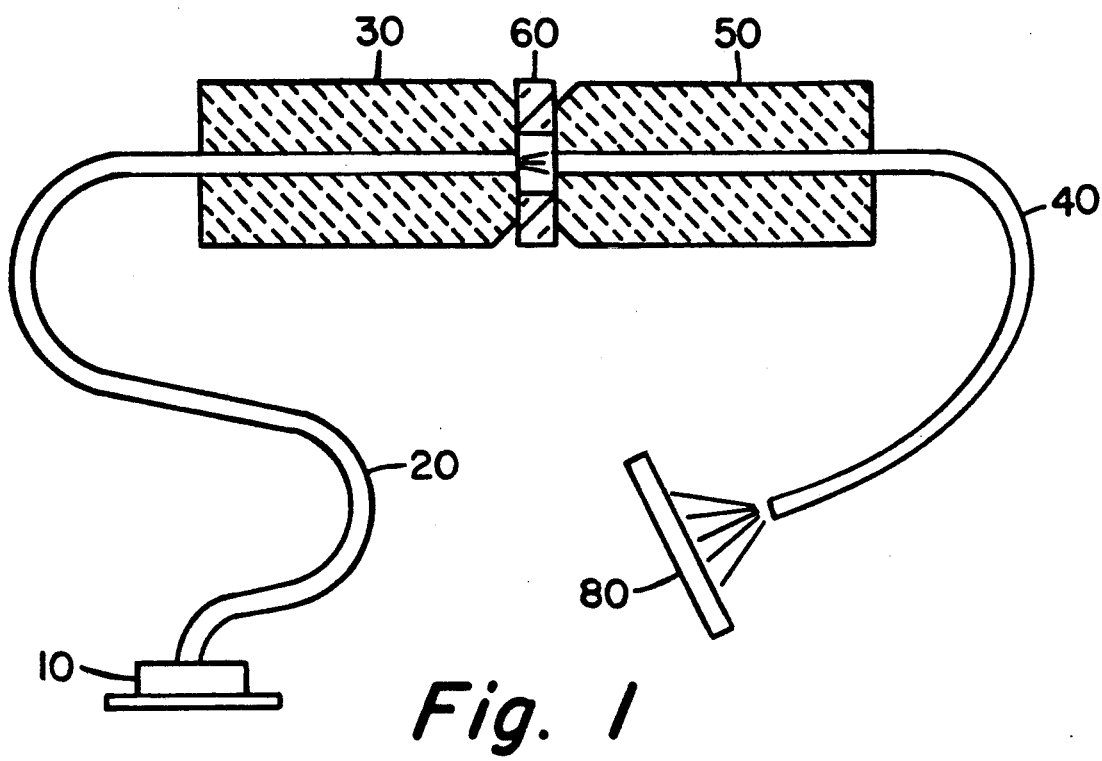
FIG. 1 is a schematic of a fiber optic sensing system in accordance with the present invention, with a connector-like restriction means in cross section.

In FIG. 1, a laser 10 illuminates the first end of the sensor fiber 20 directly. The second end is terminated in a ferrule-type fiber-optic connector 30. Light leaving the second end diverges and part of it is collected by the first end of detection lead fiber 40, which is also terminated with a ferrule-type fiber-optic connector 50. The detection lead fiber may be of the same type as the sensor fiber. The distance between the two fiber ends is controlled by a small washer 60, preferably having a diameter not greater than that of the ferrules. The two ferrules and the washer are held together by a fiber-optic connector coupling sleeve designed for the connectors used. Because the washer is thin and the connectors are spring-loaded (not shown), the added distance between the ferrule ends does not adversely affect the mechanical functioning of the coupling sleeve. Light leaving the far end of the detection lead fiber 40 (which may be quite remote, e.g. several meters to several kilometers) is gathered by a large-area detector 80 with response to light that is substantially uniform spatially.

Mixing is accomplished as the interference pattern or "speckle" pattern is projected onto the plane of the first end of the detection lead fiber. Restriction is accomplished because this detection lead fiber gathers light from only a partial region of this plane. Insensitivity is accomplished because moving the detection lead fiber only changes the distribution of light on the large-area detector 80, not the total amount that strikes it. The thickness of the washer can be chosen to produce optimum performance. For example, standard multimode optical fiber with a core diameter of 50 microns can be used for both the sensor fiber and the detection lead fiber, and illumination may be accomplished with a 780-nm diode laser. In this case, a washer thickness of about 0.013 inch is effective. If it is made either much thinner or thicker, the peak-to-peak variation of the signal may become smaller as the sensor fiber is moved.

An embodiment of the FIG. 1 system was built using a Sharp LT023MS laser operating at a wavelength of 780 nm, exciting a multimode sensor fiber. The multimode sensor fiber was a standard graded index 50-micron-core fiber with a numerical aperture of 0.2. This same standard multimode fiber type was used for the insensitive detection lead. For coupling the sensor fiber to the detection lead, industry-standard "ST" fiber-optic connectors were used (a 3M Model 01-00063 connector on each fiber end, coupled with a 3M Model 02-00033 coupling sleeve). A flat stainless-steel washer (Allied #DY730) with an outer diameter of 0.090 inch and a thickness of 0.012 inch was inserted in the coupling sleeve between the ends of the two connector ferrules.

Figure 2:
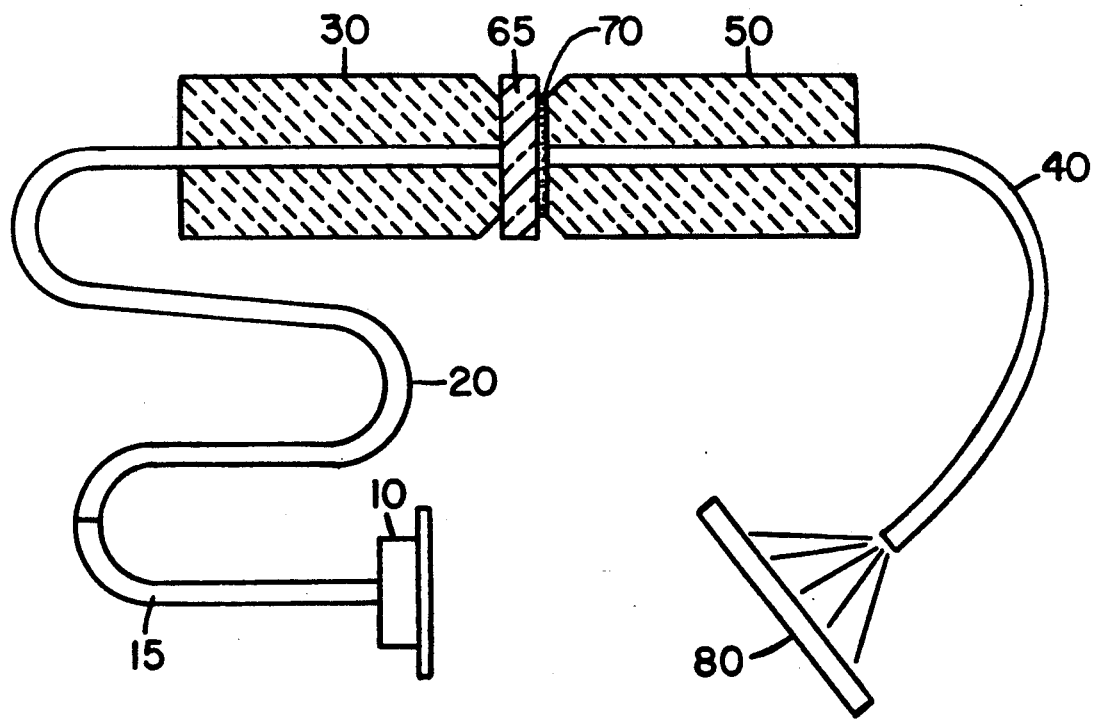
FIG. 2 is a schematic of an alternative embodiment of the inventive fiber optic sensing system, with an alternative restriction means in cross-section.

In FIG. 2, a remote laser illuminates the first end of the sensor fiber 20 through a length of single-mode fiber 15. The single-mode fiber 15 does not produce intermodal phase shifts when it is disturbed, because there is no significant modal interference. (If common circularly symmetric single-mode fiber is used there are actually two "degenerate" modes due to polarization, but such a source lead fiber does not significantly diminish the insensitivity of the system.) The remainder of the FIG. 2 system is similar to the system described with reference to FIG. 1 except that separation between the sensor fiber and the detection lead fiber is accomplished with a solid glass disk 65 rather than a washer. The glass disk 65 may be attached by glue joint 70 to the end of one of the ferrules, making assembly in the field easy because a separate small part does not need to be handled. Also, because the index of refraction of the glass can be chosen to closely match that of the fibers, glass disk 65 can significantly reduce reflections that may cause noise in the laser light source. Mixing, restriction, and insensitivity in the FIG. 2 system are accomplished by principles similar to those for FIG. 1. thickness of approximately 0.020 inch gives suitable performance when 50-micron multimode fiber is used for both the sensor fiber and the detection lead fiber, with illumination via a 780-nanometer diode laser.

The embodiment of FIG. 2 was constructed using the same components described above for the embodiment of FIG. 1, except that the laser excited the sensor fiber through an insensitive source lead made from Corning "Flexcor 850" single-mode fiber, and except that glass disk 65 was used instead of a steel washer 60. The disk was made of B270 white crown glass, 0.020 inches thick and 0.095 inches in diameter, and was attached by glue joint 70 to the end of one of the connector ferrules.

Various additional modifications and adaptations of the invention will be apparent to those skilled in the art. For example, some fiber-optic connector couplings intentionally create attenuation of the light by making a controlled axial offset of two connector ferrules. Such a coupling may also be used without modification to create restriction as required by this invention. The 3M Model 06-00040 Fixed Attenuator and related devices are examples of this type of coupling for the standard "Biconic" type of fiber-optic connector.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A fiber-optic sensor system utilizing modal interference in a multimode sensor fiber comprising:
   a) coherent source means for launching light into a first end of said multimode sensor fiber;
   b) light diverging means for projecting a multimode speckle pattern from a second end of said multimode sensor fiber;

c) detection fiber for collecting a portion of the speckle pattern light projected by said light diverging means onto a first endface of said detection fiber and providing a light output signal at a second end; and, d) detection means for measuring the intensity of said light output signal and providing an output representative of the parameter being sensed by said multimode sensor fiber;

characterized in that:

said light diverging means comprises a spacer means of a predetermined axial length disposed between said multimode sensor fiber and said detection fiber to provide a pre-selected axial separation between the ends thereof; and, the core diameter of said detection fiber is less than the diameter of said multimode speckle pattern projected by said light diverging means onto the first endface of said detection fiber, thereby enabling the collection of said portion of said projected speckle pattern light.

2. The fiber-optic sensor system of claim 1, wherein said light diverging means further comprises:

a) first connector body for receiving said second end of said multimode sensor fiber; and b) second connector body for receiving said first end of said detection fiber; and wherein, said spacer means separates said first connector body and said second connector body.

3. The fiber-optic sensor system of claim 2, wherein said spacer means comprises a flat annular ring for providing an air gap between said second end of said multimode sensor fiber and said first end of said detection fiber.

4. The fiber-optic sensor system of claim 2, wherein said spacer means comprises a preselected thickness of transparent dielectric material for providing a separation between said second end of said multimode sensor fiber and said first end of said detection fiber.

5. The fiber-optic sensor system of claim 4, wherein said transparent dielectric material comprises glass.

6. The fiber-optic sensor system of claim 5, wherein said spacer means comprises a glass disk.

7. The fiber-optic sensor system of claim 2, wherein said spacer means is attached to one of said connector bodies.

8. The fiber-optic sensor system of claim 7, wherein said spacer means is attached with glue to one of said connector bodies.

9. The fiber-optic sensor system of claim 2, wherein said first and second connector bodies are held together by a connector coupling sleeve.

10. The fiber-optic sensor system of claim 9, wherein said spacer means is integral with said connector coupling sleeve.

* * * * *